(12) United States Patent
Eagle et al.

(10) Patent No.: US 8,073,866 B2
(45) Date of Patent: Dec. 6, 2011

(54) METHOD FOR PROVIDING CONTENT TO AN INTERNET USER BASED ON THE USER'S DEMONSTRATED CONTENT PREFERENCES

(75) Inventors: Scott Eagle, Menlo Park, CA (US);
Scott VanDeVelde, Menlo Park, CA (US)

(73) Assignee: Claria Innovations, LLC, Sherman Oaks, CA (US)

( * ) Notice: Subject to any disclaimer, the term of this patent is extended or adjusted under 35 U.S.C. 154(b) by 780 days.

(21) Appl. No.: 11/377,932

(22) Filed: Mar. 16, 2006

(65) Prior Publication Data
US 2006/0253432 A1    Nov. 9, 2006

Related U.S. Application Data

(60) Provisional application No. 60/662,680, filed on Mar. 17, 2005.

(51) Int. Cl.
*G06F 17/30* (2006.01)
*G06F 7/00* (2006.01)
(52) U.S. Cl. ......... 707/770; 707/706; 707/736; 707/758
(58) Field of Classification Search .................. 707/758, 707/770
See application file for complete search history.

(56) References Cited

U.S. PATENT DOCUMENTS

| | | | |
|---|---|---|---|
| 4,455,083 A | 6/1984 | Elmes | |
| 4,575,579 A | 3/1986 | Simon et al. | |
| 4,719,567 A | 1/1988 | Whittington et al. | |
| 4,775,935 A | 10/1988 | Yourick | |
| 4,782,449 A | 11/1988 | Brinker et al. | |
| 4,799,146 A | 1/1989 | Chauvel | |
| 4,850,007 A | 7/1989 | Marino et al. | |
| 4,977,594 A | 12/1990 | Shear | |
| 5,027,400 A | 6/1991 | Baji et al. | |
| 5,029,104 A | 7/1991 | Dodson et al. | |
| 5,093,718 A | 3/1992 | Hoarty et al. | |

(Continued)

FOREIGN PATENT DOCUMENTS

EP    0631231    12/1994

(Continued)

OTHER PUBLICATIONS

PCT International Search Report and Written Opinion of the International Searching Authority for International Application No. PCT/US06/09954 (filed Mar. 17, 2006), mailed Aug. 30, 2006.

(Continued)

*Primary Examiner* — Tim T Vo
*Assistant Examiner* — Sangwoo Ahn
(74) *Attorney, Agent, or Firm* — Davidson Berquist Jackson & Gowdey, LLP; Brian Siritzky

(57) ABSTRACT

A method of providing content from an internet server to an internet user based on the user's internet navigation history. The method begins with the step of installing a profile decoder, including a profile library, on the server. The profile decoder maps server content to content categories contained in the profile library. The server then receives a communication from a user then in internet communication with the server, at least a portion of that communication including an encrypted summary of user navigation history. The server then processes the user communication in the profile decoder to identify user content preferences by matching user content preferences with available server content, employing the profile server. Finally, the server provides content to the user based on the user's identified preferences.

18 Claims, 5 Drawing Sheets

U.S. PATENT DOCUMENTS

| | | | |
|---|---|---|---|
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahara et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,092 A | 11/1998 | Boudreau et al. |
| 5,835,722 A | 11/1998 | Bradshaw et al. |
| 5,838,458 A | 11/1998 | Tsai |

| | | | | | |
|---|---|---|---|---|---|
| 5,848,246 A | 12/1998 | Gish | 5,978,836 A | 11/1999 | Ouchi |
| 5,848,396 A | 12/1998 | Gerace | 5,978,841 A | 11/1999 | Berger |
| 5,848,397 A | 12/1998 | Marsh et al. | 5,978,842 A | 11/1999 | Noble et al. |
| 5,850,352 A | 12/1998 | Moezzi et al. | 5,983,227 A | 11/1999 | Nazem et al. |
| 5,850,433 A | 12/1998 | Rondeau | 5,983,244 A | 11/1999 | Nation |
| 5,854,897 A | 12/1998 | Radziewicz et al. | 5,983,268 A | 11/1999 | Freivald et al. |
| 5,855,008 A | 12/1998 | Goldhaber et al. | 5,987,466 A | 11/1999 | Greer et al. |
| 5,861,880 A | 1/1999 | Shimizu et al. | 5,987,606 A | 11/1999 | Cirasole et al. |
| 5,861,883 A | 1/1999 | Cuomo et al. | 5,991,735 A | 11/1999 | Gerace |
| 5,862,260 A | 1/1999 | Rhoads | 5,991,799 A | 11/1999 | Yen et al. |
| 5,862,325 A | 1/1999 | Reed et al. | 5,995,597 A | 11/1999 | Woltz et al. |
| 5,864,823 A | 1/1999 | Levitan | 5,995,943 A | 11/1999 | Bull et al. |
| 5,870,769 A | 2/1999 | Freund | 5,996,007 A | 11/1999 | Klug et al. |
| 5,872,850 A | 2/1999 | Klein et al. | 5,996,011 A | 11/1999 | Humes |
| 5,875,296 A | 2/1999 | Shi et al. | 5,999,526 A | 12/1999 | Garland et al. |
| 5,877,766 A | 3/1999 | Bates et al. | 5,999,731 A | 12/1999 | Yellin et al. |
| 5,878,231 A | 3/1999 | Baehr et al. | 5,999,740 A | 12/1999 | Rowley |
| 5,883,955 A | 3/1999 | Ronning | 5,999,912 A | 12/1999 | Wodarz et al. |
| 5,884,025 A | 3/1999 | Baehr et al. | 6,002,401 A | 12/1999 | Baker |
| 5,886,683 A | 3/1999 | Tognazzini et al. | 6,006,241 A | 12/1999 | Purnaveja et al. |
| 5,887,133 A | 3/1999 | Brown et al. | 6,006,252 A | 12/1999 | Wolfe |
| 5,890,152 A | 3/1999 | Rapaport et al. | 6,006,265 A | 12/1999 | Rangan et al. |
| 5,892,917 A | 4/1999 | Myerson | 6,009,236 A | 12/1999 | Mishima et al. |
| 5,893,053 A | 4/1999 | Trueblood | 6,009,409 A | 12/1999 | Adler et al. |
| 5,893,118 A | 4/1999 | Sonderegger | 6,009,410 A | 12/1999 | LeMole et al. |
| 5,894,554 A | 4/1999 | Lowery et al. | 6,011,537 A | 1/2000 | Slotznick |
| 5,897,622 A | 4/1999 | Blinn et al. | 6,012,083 A | 1/2000 | Savitzky et al. |
| 5,898,434 A | 4/1999 | Small et al. | 6,014,502 A | 1/2000 | Moraes |
| 5,901,287 A | 5/1999 | Bull et al. | 6,014,638 A | 1/2000 | Burge et al. |
| 5,903,892 A | 5/1999 | Hoffert et al. | 6,014,698 A | 1/2000 | Griffiths |
| 5,905,492 A | 5/1999 | Straub et al. | 6,014,711 A | 1/2000 | Brown |
| 5,905,800 A | 5/1999 | Moskowitz et al. | 6,016,509 A | 1/2000 | Dedrick |
| 5,907,838 A | 5/1999 | Miyasaka et al. | 6,020,884 A | 2/2000 | MacNaughton et al. |
| 5,913,040 A | 6/1999 | Rakavy et al. | 6,023,726 A | 2/2000 | Saksena |
| 5,918,012 A | 6/1999 | Astiz et al. | 6,025,837 A | 2/2000 | Matthews, III et al. |
| 5,918,013 A | 6/1999 | Mighdoll et al. | 6,025,886 A | 2/2000 | Koda |
| 5,918,014 A | 6/1999 | Robinson | 6,026,368 A | 2/2000 | Brown et al. |
| 5,918,214 A | 6/1999 | Perkowski | 6,026,413 A | 2/2000 | Challenger et al. |
| 5,920,697 A | 7/1999 | Masters et al. | 6,026,433 A | 2/2000 | D'Arlach et al. |
| 5,923,845 A | 7/1999 | Kamiya et al. | 6,026,933 A | 2/2000 | King et al. |
| 5,923,853 A | 7/1999 | Danneels | 6,029,045 A | 2/2000 | Picco et al. |
| 5,929,850 A | 7/1999 | Broadwin et al. | 6,029,141 A | 2/2000 | Bezos et al. |
| 5,930,446 A | 7/1999 | Kanda | 6,029,145 A | 2/2000 | Barritz |
| 5,930,700 A | 7/1999 | Pepper et al. | 6,029,182 A | 2/2000 | Nehab et al. |
| 5,930,801 A | 7/1999 | Falkenhainer et al. | 6,029,195 A | 2/2000 | Herz |
| 5,931,901 A | 8/1999 | Wolfe et al. | 6,035,332 A | 3/2000 | Ingrassia, Jr. et al. |
| 5,931,907 A | 8/1999 | Davies et al. | 6,047,318 A | 4/2000 | Becker et al. |
| 5,933,811 A | 8/1999 | Angles et al. | 6,047,327 A | 4/2000 | Tso et al. |
| 5,933,832 A | 8/1999 | Suzuoka et al. | 6,049,821 A | 4/2000 | Theriault et al. |
| 5,936,679 A | 8/1999 | Kasahara et al. | 6,052,709 A | 4/2000 | Paul |
| 5,937,037 A | 8/1999 | Kamel et al. | 6,052,717 A | 4/2000 | Reynolds et al. |
| 5,937,390 A | 8/1999 | Hyodo | 6,052,730 A | 4/2000 | Felciano et al. |
| 5,937,392 A | 8/1999 | Alberts | 6,055,572 A | 4/2000 | Saksena |
| 5,937,411 A | 8/1999 | Becker | 6,058,141 A | 5/2000 | Barger et al. |
| 5,943,478 A | 8/1999 | Aggarwal et al. | 6,061,054 A | 5/2000 | Jolly |
| 5,944,791 A | 8/1999 | Scherpbier | 6,061,659 A | 5/2000 | Murray |
| 5,946,646 A | 8/1999 | Schena et al. | 6,061,716 A | 5/2000 | Moncreiff |
| 5,946,664 A | 8/1999 | Ebisawa | 6,065,024 A | 5/2000 | Renshaw |
| 5,946,697 A | 8/1999 | Shen | 6,065,056 A | 5/2000 | Bradshaw et al. |
| 5,948,061 A | 9/1999 | Merriman et al. | 6,067,559 A | 5/2000 | Allard et al. |
| 5,951,300 A | 9/1999 | Brown | 6,067,561 A | 5/2000 | Dillon |
| 5,956,693 A | 9/1999 | Geerlings | 6,067,565 A | 5/2000 | Horvitz |
| 5,956,716 A | 9/1999 | Kenner et al. | 6,070,140 A | 5/2000 | Tran |
| 5,958,008 A | 9/1999 | Pogrebisky et al. | 6,073,105 A | 6/2000 | Sutcliffe et al. |
| 5,958,015 A | 9/1999 | Dascalu | 6,073,167 A | 6/2000 | Poulton et al. |
| 5,959,621 A | 9/1999 | Nawaz et al. | 6,073,241 A | 6/2000 | Rosenberg et al. |
| 5,959,623 A | 9/1999 | van Hoff et al. | 6,076,166 A | 6/2000 | Moshfeghi et al. |
| 5,960,409 A | 9/1999 | Wexler | 6,078,916 A | 6/2000 | Culliss |
| 5,961,593 A | 10/1999 | Gabber et al. | 6,081,840 A | 6/2000 | Zhao |
| 5,961,602 A | 10/1999 | Thompson et al. | 6,084,581 A | 7/2000 | Hunt |
| 5,961,603 A | 10/1999 | Kunkel et al. | 6,085,193 A | 7/2000 | Malkin et al. |
| 5,963,909 A | 10/1999 | Warren et al. | 6,085,226 A | 7/2000 | Horvitz |
| 5,963,915 A | 10/1999 | Kirsch | 6,085,242 A | 7/2000 | Chandra |
| 5,966,121 A | 10/1999 | Hubbell et al. | 6,088,731 A | 7/2000 | Kiraly et al. |
| 5,970,473 A | 10/1999 | Gerszberg et al. | 6,091,411 A | 7/2000 | Straub et al. |
| 5,974,219 A | 10/1999 | Fujita et al. | 6,092,196 A | 7/2000 | Reiche |
| 5,974,451 A | 10/1999 | Simmons | 6,094,655 A | 7/2000 | Rogers et al. |
| 5,978,807 A | 11/1999 | Mano et al. | 6,094,677 A | 7/2000 | Capek et al. |
| 5,978,833 A | 11/1999 | Pashley et al. | 6,098,064 A | 8/2000 | Pirolli et al. |

| Patent | Date | Inventor |
|---|---|---|
| 6,098,065 A | 8/2000 | Skillen et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,112,246 A | 8/2000 | Horbal et al. |
| 6,115,680 A | 9/2000 | Coffee et al. |
| 6,119,098 A | 9/2000 | Guyot et al. |
| 6,119,165 A | 9/2000 | Li et al. |
| 6,122,632 A | 9/2000 | Botts et al. |
| 6,125,388 A | 9/2000 | Reisman |
| 6,128,655 A | 10/2000 | Fields et al. |
| 6,128,663 A | 10/2000 | Thomas |
| 6,133,912 A | 10/2000 | Montero |
| 6,133,918 A | 10/2000 | Conrad et al. |
| 6,134,380 A | 10/2000 | Kushizaki |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyle |
| 6,144,944 A | 11/2000 | Kurtzman, II et al. |
| 6,151,596 A | 11/2000 | Hosomi |
| 6,154,738 A | 11/2000 | Call |
| 6,154,771 A | 11/2000 | Rangan et al. |
| 6,157,924 A | 12/2000 | Austin |
| 6,157,946 A | 12/2000 | Itakura et al. |
| 6,161,112 A | 12/2000 | Cragun et al. |
| 6,163,778 A | 12/2000 | Fogg et al. |
| 6,167,438 A | 12/2000 | Yates et al. |
| 6,167,453 A | 12/2000 | Becker et al. |
| 6,178,443 B1 | 1/2001 | Lin |
| 6,178,461 B1 | 1/2001 | Chan et al. |
| 6,182,066 B1 | 1/2001 | Marques |
| 6,182,097 B1 | 1/2001 | Hansen et al. |
| 6,182,122 B1 | 1/2001 | Berstis |
| 6,182,133 B1 | 1/2001 | Horvitz |
| 6,183,366 B1 | 2/2001 | Goldberg et al. |
| 6,185,558 B1 | 2/2001 | Bowman et al. |
| 6,185,586 B1 | 2/2001 | Judson |
| 6,185,614 B1 | 2/2001 | Cuomo et al. |
| 6,191,782 B1 | 2/2001 | Mori et al. |
| 6,192,380 B1 | 2/2001 | Light et al. |
| 6,195,622 B1 | 2/2001 | Altschuler et al. |
| 6,198,906 B1 | 3/2001 | Boetje et al. |
| 6,199,079 B1 | 3/2001 | Gupta et al. |
| 6,202,093 B1 | 3/2001 | Bolam et al. |
| 6,204,840 B1 | 3/2001 | Petelcyky et al. |
| 6,208,339 B1 | 3/2001 | Atlas et al. |
| 6,216,141 B1 | 4/2001 | Straub et al. |
| 6,216,212 B1 | 4/2001 | Challenger et al. |
| 6,219,676 B1 | 4/2001 | Reiner |
| 6,222,520 B1 | 4/2001 | Gerszberg et al. |
| 6,223,215 B1 | 4/2001 | Hunt et al. |
| 6,233,564 B1 | 5/2001 | Schulze, Jr. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,256,620 B1 | 7/2001 | Jawahar et al. |
| 6,266,058 B1 | 7/2001 | Meyer |
| 6,269,361 B1 | 7/2001 | Davis et al. |
| 6,275,854 B1 | 8/2001 | Himmel et al. |
| 6,279,112 B1 | 8/2001 | O'Toole et al. |
| 6,280,043 B1 | 8/2001 | Ohkawa |
| 6,285,987 B1 | 9/2001 | Roth et al. |
| 6,286,043 B1 | 9/2001 | Cuomo et al. |
| 6,286,045 B1 | 9/2001 | Griffiths et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schema et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,353,834 B1 | 3/2002 | Wong et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,735 B1 | 4/2002 | Hunt |
| 6,381,742 B2 | 4/2002 | Forbes et al. |
| 6,385,592 B1 | 5/2002 | Angles et al. |
| 6,392,668 B1 | 5/2002 | Murray |
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,421,729 B1 | 7/2002 | Paltenghe et al. |
| 6,434,745 B1 | 8/2002 | Conley, Jr. et al. |
| 6,437,802 B1 | 8/2002 | Kenny |
| 6,438,215 B1 | 8/2002 | Skladman et al. |
| 6,438,578 B1 | 8/2002 | Schmid et al. |
| 6,438,579 B1 | 8/2002 | Hosken |
| 6,441,832 B1 | 8/2002 | Tao et al. |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,452,612 B1 | 9/2002 | Holtz et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,484,148 B1 | 11/2002 | Boyd |
| 6,487,538 B1 | 11/2002 | Gupta et al. |
| 6,490,722 B1 | 12/2002 | Barton et al. |
| 6,493,702 B1 | 12/2002 | Adar et al. |
| 6,496,931 B1 | 12/2002 | Rajchel et al. |
| 6,499,052 B1 | 12/2002 | Hoang et al. |
| 6,502,076 B1 | 12/2002 | Smith |
| 6,505,201 B1 | 1/2003 | Haitsuka et al. |
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,526,411 B1 | 2/2003 | Ward |
| 6,529,903 B2 | 3/2003 | Smith et al. |
| 6,539,375 B2 * | 3/2003 | Kawasaki ........................ 707/5 |
| 6,539,424 B1 | 3/2003 | Dutta |
| 6,564,202 B1 | 5/2003 | Schuetze et al. |
| 6,567,850 B1 | 5/2003 | Freishtat et al. |
| 6,567,854 B1 | 5/2003 | Olshansky et al. |
| 6,570,595 B2 | 5/2003 | Porter |
| 6,572,662 B2 | 6/2003 | Manohar et al. |
| 6,584,479 B2 | 6/2003 | Chang |
| 6,584,492 B1 | 6/2003 | Cezar et al. |
| 6,584,505 B1 | 6/2003 | Howard et al. |

| | | |
|---|---|---|
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,606,652 B1 | 8/2003 | Cohn et al. |
| 6,615,247 B1 | 9/2003 | Murphy |
| 6,622,168 B1 | 9/2003 | Datta |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,741 B1 | 4/2004 | Eyal |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman |
| 6,785,723 B1 | 8/2004 | Genty et al. |
| 6,801,906 B1 | 10/2004 | Bates et al. |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman et al. |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,226 B1 | 5/2005 | Tso et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz et al. |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 * | 1/2006 | Miyasaka et al. ............ 715/201 |
| 6,993,532 B1 | 1/2006 | Platt |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin |
| 7,194,425 B2 | 3/2007 | Nyhan et al. |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson |
| 7,451,065 B2 | 11/2008 | Pednault et al. |
| 7,454,364 B2 | 11/2008 | Shkedi |
| 7,464,155 B2 | 12/2008 | Mousavi et al. |
| 7,512,603 B1 | 3/2009 | Veteska et al. |
| 7,630,986 B1 | 12/2009 | Herz et al. |
| 7,743,340 B2 | 6/2010 | Horvitz et al. |
| 7,844,488 B2 | 11/2010 | Merriman et al. |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |
| 2002/0040374 A1 | 4/2002 | Kent |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0087499 A1 | 7/2002 | Stockfisch |
| 2002/0087621 A1 | 7/2002 | Hendriks |
| 2002/0091700 A1 | 7/2002 | Steele et al. |

| Publication No. | Date | Inventor |
|---|---|---|
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099767 A1 | 7/2002 | Cohen et al. |
| 2002/0099812 A1 | 7/2002 | Davis et al. |
| 2002/0099824 A1 | 7/2002 | Bender et al. |
| 2002/0103811 A1 | 8/2002 | Fankhauser et al. |
| 2002/0107847 A1 | 8/2002 | Johnson |
| 2002/0107858 A1 | 8/2002 | Lundahl et al. |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128908 A1 | 9/2002 | Levin et al. |
| 2002/0128925 A1 | 9/2002 | Angeles |
| 2002/0152121 A1 | 10/2002 | Hiroshi |
| 2002/0152126 A1 | 10/2002 | Lieu et al. |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0170068 A1 | 11/2002 | Rafey et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2002/0198778 A1 | 12/2002 | Landsman et al. |
| 2003/0004804 A1 | 1/2003 | Landsman et al. |
| 2003/0005000 A1 | 1/2003 | Landsman et al. |
| 2003/0005067 A1 | 1/2003 | Martin et al. |
| 2003/0005134 A1 | 1/2003 | Martin et al. |
| 2003/0011639 A1 | 1/2003 | Webb |
| 2003/0014304 A1 | 1/2003 | Calvert et al. |
| 2003/0014399 A1 | 1/2003 | Hansen et al. |
| 2003/0018778 A1 | 1/2003 | Martin et al. |
| 2003/0018885 A1 | 1/2003 | Landsman et al. |
| 2003/0023481 A1 | 1/2003 | Calvert et al. |
| 2003/0023488 A1 | 1/2003 | Landsman et al. |
| 2003/0023698 A1 | 1/2003 | Dieberger et al. |
| 2003/0028529 A1 | 2/2003 | Cheung et al. |
| 2003/0028565 A1 | 2/2003 | Landsman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0040958 A1 | 2/2003 | Fernandes |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0052913 A1 | 3/2003 | Barile |
| 2003/0074448 A1 | 4/2003 | Kinebuchi |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0115157 A1 | 6/2003 | Circenis |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0135853 A1 | 7/2003 | Goldman et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0176931 A1 | 9/2003 | Pednault et al. |
| 2003/0182184 A1 | 9/2003 | Strasnick et al. |
| 2003/0195837 A1 | 10/2003 | Kostic et al. |
| 2003/0195877 A1 | 10/2003 | Ford et al. |
| 2003/0206720 A1 | 11/2003 | Abecassis |
| 2003/0208472 A1 | 11/2003 | Pham |
| 2003/0220091 A1 | 11/2003 | Farrand |
| 2003/0221167 A1 | 11/2003 | Goldstein et al. |
| 2003/0229542 A1 | 12/2003 | Morrisroe |
| 2004/0002896 A1 | 1/2004 | Alanen et al. |
| 2004/0024756 A1 | 2/2004 | Rickard |
| 2004/0030798 A1 | 2/2004 | Anderson et al. |
| 2004/0044677 A1 | 3/2004 | Huper-Graff |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0117353 A1 | 6/2004 | Ishag |
| 2004/0133845 A1 | 7/2004 | Forstall et al. |
| 2004/0162738 A1 | 8/2004 | Sanders et al. |
| 2004/0162759 A1 | 8/2004 | Willis |
| 2004/0163101 A1 | 8/2004 | Swix et al. |
| 2004/0167926 A1 | 8/2004 | Anderson et al. |
| 2004/0167928 A1 | 8/2004 | Anderson et al. |
| 2004/0181525 A1 | 9/2004 | Itzhak et al. |
| 2004/0181604 A1 | 9/2004 | Immonen |
| 2004/0193488 A1 | 9/2004 | Khoo et al. |
| 2004/0210533 A1 | 10/2004 | Picker |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0254810 A1 | 12/2004 | Yamaga et al. |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027821 A1 | 2/2005 | Alexander et al. |
| 2005/0027822 A1 | 2/2005 | Plaza |
| 2005/0033657 A1 | 2/2005 | Herrington et al. |
| 2005/0038819 A1 | 2/2005 | Hicken |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102177 A1 | 5/2005 | Takayama |
| 2005/0102202 A1 | 5/2005 | Linden et al. |
| 2005/0102282 A1 | 5/2005 | Linden |
| 2005/0125382 A1 | 6/2005 | Karnawat et al. |
| 2005/0131762 A1 | 6/2005 | Bharat et al. |
| 2005/0132267 A1 | 6/2005 | Aviv |
| 2005/0149404 A1 | 7/2005 | Barnett et al. |
| 2005/0155031 A1 | 7/2005 | Wang et al. |
| 2005/0182773 A1 | 8/2005 | Feinsmith |
| 2005/0187823 A1 | 8/2005 | Howes |
| 2005/0203796 A1 | 9/2005 | Anand et al. |
| 2005/0204148 A1* | 9/2005 | Mayo et al. .................. 713/185 |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0240599 A1 | 10/2005 | Sears |
| 2005/0273463 A1 | 12/2005 | Zohar et al. |
| 2005/0289120 A9 | 12/2005 | Soulanille et al. |
| 2006/0015390 A1 | 1/2006 | Rijsinghani et al. |
| 2006/0026233 A1 | 2/2006 | Tenembaum et al. |
| 2006/0031253 A1 | 2/2006 | Newbold et al. |
| 2006/0053230 A1 | 3/2006 | Montero |
| 2006/0074748 A1 | 4/2006 | Kline et al. |
| 2006/0074751 A1 | 4/2006 | Kline et al. |
| 2006/0136524 A1 | 6/2006 | Wohlers et al. |
| 2006/0136528 A1 | 6/2006 | Martin et al. |
| 2006/0136728 A1 | 6/2006 | Gentry et al. |
| 2006/0235965 A1 | 10/2006 | Bennett et al. |
| 2006/0253432 A1 | 11/2006 | Eagle et al. |
| 2007/0016469 A1 | 1/2007 | Bae et al. |
| 2007/0038956 A1 | 2/2007 | Morris |

FOREIGN PATENT DOCUMENTS

| | | |
|---|---|---|
| EP | 0822535 | 2/1998 |
| EP | 1045547 | 10/2000 |
| EP | 1154611 | 11/2001 |
| EP | 1207468 | 5/2002 |
| JP | 343825 | 2/1991 |
| JP | 11066099 | 3/1999 |
| JP | 2001084256 | 3/2001 |
| JP | 2001147894 | 5/2001 |
| JP | 20010222535 | 8/2001 |
| JP | 2001312482 | 11/2001 |

| | | |
|---|---|---|
| JP | 2002024221 | 1/2002 |
| JP | 2002032401 | 1/2002 |
| JP | 2002073545 | 3/2002 |
| JP | 2002259371 | 9/2002 |
| JP | 2002334104 | 11/2002 |
| JP | 2003058572 | 2/2003 |
| JP | 2003141155 | 5/2003 |
| JP | 2003178092 | 6/2003 |
| JP | 20030271647 | 9/2003 |
| JP | 2004-355376 | 12/2004 |
| WO | WO 9847090 | 10/1998 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 99/59097 | 11/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 | 11/2001 |
| WO | WO 03/010685 | 2/2003 |
| WO | WO 02/44869 A1 | 6/2006 |

OTHER PUBLICATIONS

International Preliminary Report on Patentability in PCT Appln. No. PCT/US2004/07714, dated Oct. 1, 2005 [4 pages].
International Search Report in PCT Appln. No. PCT/US2004/07714, mailed Mar. 31, 2005 [1 page].
U.S. Appl. No. 11/210,209, filed Oct. 16, 2007 Office Action.
U.S. Appl. No. 11/211,197, filed Jun. 23, 2005 PTO Office Action.
U.S. Appl. No. 11/427,243, filed May 10, 2011 PTO Office Action.
Written Opinion in PCT Appln. No. PCT/US2004/07714, mailed Mar. 31, 2005 [3 pages].
Codelifter.Com: JavaScript Index Windows and Frames. [online] [retrieved on Dec. 19, 2005]. Retrieved from the internet<URL:// http://www.codelifter.com/main/javascript/index_windowframes. html > Cited by EPO as "X"reference for EP 02 77 8589 in Supplementary European Se.
EPO Communication in European Appln. No. 02778589, completed Dec. 21, 2005 (2 Sheets).
EPO Communication in European Appln. No. 04795209, mailed Feb. 17, 2011 [160 pages].
EPO Communication in European Appln. No. 04795209, mailed Feb. 17, 2011 [4 pages].
EPO File History of EP 2004795209, downloaded from European Patent Office on Apr. 13, 2011 [164 pgs.].
EPO, File history of EP 2004794999, downloaded from EPO Apr. 13, 2011 [204 pgs.].
EPO, File history of EP1714221 (downloaded from EPO on Apr. 13, 2011) [139 pages].
Heinle et al. 1997. Designing with JavaScript: Creating Dynamic Web Pages.Sep. 1997, pp. 1-33, 46, 83 [Cited by EPO as "A" reference for EP 02 77 8589 in Supplementary European Search Report dated Dec. 21, 2005].
IRTORG-Internet Related Technologies: "irt.org-JavaScript Windows FAQ Knowledge Base" Internet Article, Online! June 3, 2000, XP002360403, Retrieved from the Internet : URL:http://web. archive.org/web/20000619232700/developer.irt.org/script/window. htm> (retrieved on Dec. 19, 2000) [Cited by EPO as "X"reference for EP 02 77 8589 in Supplementary European Search Report dated Dec. 21, 2005].
Keys. 1998. Every Possible Internet Advertisement Drastic Increase of Click Through Rate by Interactivity and Multimedia. Nikkei Internet Technology. Dec. 22, 1998. Jan. Issue (1999), vol. 18, pp. 118-127.
KIPO, Official Action in Korean Patent Appln. No. 10-2006-7008977.
Office Action mailed Nov. 2, 2005 from U.S. Appl. No. 10/061,107, filed Jan. 25, 2002.
Office Action mailed Aug. 13, 2003 from U.S. Appl. No. 10/061,107, filed Jan. 25, 2002.
Office Action mailed Jan. 14, 2004 in U.S. Appl. No. 10/061,107, filed Jan. 25, 2002.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jul. 27, 2005 from U.S. Appl. No. 10/056,932, filed Jan. 25, 2002.
Office Action mailed Sep. 28, 2010 from U.S. Appl. No. 10/061,107, filed Jan. 25, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Offie Action mailed May 5, 2006 from U.S. Appl. No. 10/061,107 filed Jan. 25, 2002.
Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of Jun. 10 issue).
U.S. Appl. No. 10/061,107, filed Apr. 18, 2011 PTO Office Action.
U.S. Appl. No. 11/420,191, filed Mar. 25, 2011 PTO Office Action.
USPTO, Office Action mailed Nov. 28, 2006 for U.S. Appl. No. 10/227,168, filed Aug. 23, 2002.
USPTO, Office Action mailed Jul. 3, 2006 from U.S. Appl. No. 10/227,168, filed Aug. 23, 2002.
WIPO, International Preliminary Report on Patentability (Chap. I of PCT) for PCT/USO4/33777, Jan. 23, 2006 [4 pgs].
WIPO, International Preliminary Report on Patentability (Chap. I of PCT) for PCT/US05/01022, Aug. 14, 2006 [6 pgs].
WIPO, International Search Report for PCT/USO4/33777, Jan. 19, 2006 [3 pgs.].
WIPO, International Search Report for PCT/US05/01022, Apr. 24, 2006 [3 pgs.].
WIPO, Written Opinion of the International Searching Authority for PCT/ USO4/33777, Jan. 23, 2006 [3 pgs].
WIPO, Written Opinion of the International Searching Authority for PCT/US05/01022, Apr. 26, 2006 [5 pgs].
ACM Portal USPTO Search, "Communications of the ACM: vol. 52, Issue 1", Association for Computing Machinery, dated Jan. 2009, 1 page.
Aggarwal, Charu C. et al. 2001. Intelligent Crawling on the World Wide Web with Arbitrary Predicates. ACM, pp. 96-105.
BackWeb Technologies Ltd., BackWEB User's Guide, 1997, [48 pgs.].
Bae, Sung Min, et al., "Fuzzy Web Ad Selector", IEEE Intelligent Systems, vol. 18 Issue 6, Nov./Dec. 2003, pp. 62-69.
Broder, Alan J., "Data Mining the Internet and Privacy", WEBKDD '99, LNAI 1836, Springer-Verlag, Berlin, Germany, (c) 2000, pp. 56-73.
Bucklin, Randolph E., et al., "Choice and the Internet: From Clickstream to Research Stream", Marketing Letters, vol. 13, No. 3, Aug. 2002, pp. 245-258.
Claypool, et al., Inferring User Interest, Worcester Polytechnic Inst., IEEE Internet Computing, Nov.-Dec. 2001, pp. 32-39 [8 pgs.].
comScore Marketing Solutions and Media Metrix (9 sheets), webpage) online), 2003 comScore Networks, Inc. (retrieved on Oct. 8, 2003), retrieved from the internet: <URL:http://vAvw.comscore. com>.
Copernic, Copernic: Software to Search, Find, and Manage Information, Copernic Technologies, Inc. 2004, 2 pgs. (retrieved on Apr. 6, 2004). Retrieved from the Internet:<URL:http://www.copernic.com/ en/index.html>.
Diligenti, Michelangelo et al. 2004. A Unified Probalistic Framework for Web Page Scoring Systems. IEEE, vol. 16, No. 1. Jan. 2004, pp. 4-16.
Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.
Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.
EPO, Communication for EP 03 75 5344, Feb. 14, 2011 [4 pgs.].
EPO, File history of EP-03755344.3, Method and Apparatus for Displaying Messages in Computer Systems, as of Feb. 21, 2011 [121 pgs.].
EPO, Supplementary European Search Report for EP 03 75 5344, Jun. 30, 2009, mailed Jul. 10, 2009 [2 pgs.].
European Search Report for Application No. EP 06 01 3103 (2 sheets).
Favela, Jesus et al. 1997. Image-Retrieval Agent: Integrating Image Content and Text. IEE, vol. 1.14, pp. 36-39.
Fenstermacher, Kurt D., et al., "Client-Side Monitoring for Web Mining", Journal of the American Society for Information Science and Technology, vol. 54, Issue 7, May 2003, pp. 625-637.
Fenstermacher, Kurt D., et al., "Mining Client-Side Activity for Personalization", WECWIS 2002, (c) 2002, pp. 205-212.
Foreign Examination Report cited in corresponding Great Britain application, GB0724938.6, dated Jan. 11, 2010, 2 pages.
Friedman, Batya, et al., "Informed Consent in the Mozilla Browser: Implementing Value-Sensitive Design", HICSS-35 '02, Jan. 2002, pp. 10-19.
Fu, Xiaobin, et al., "Mining Navigation History for Recommendation", IUI 2000, New Orleans, LA, (c) 2000, pp. 106-112.
Google Search, "Result Search Query Build Search Engine Index Using Gather Consumer Navigate Search", http://scholar.google.com/scholar, dated Apr. 7, 2010, 3 pages.
Gralla, Preston, How the Internet Works, Special Edition, Ziff-Davis Press, Emeryville, CA, .(c) 1997, pp. 254 and 266-271.
Greening, Dan R., "Tracking Users: What Marketers Really Want to Know", Web Techniques, Jul. 1999, downloaded from: www.webtechniques.com/archives/1999/07/, pp. 1-9.
Hancock, Wayland, "A new way to get information from the Internet," American Agent & Broker, Nov. 1997, 69, 11, pp. 65-66 [2 pgs.].
Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04.
Hun, Ke et al. 2003. A Probabilistic Model for Intelligent Web Crawlers. IEEE, pp. 278-282.
International Preliminary Report on Patentability and Written Opinion in PCT Appln. No. PCT/US2004/033777, mailed Jan. 19, 2006.
International Preliminary Report on Patentability and Written Opinion in PCT Appln. No. PCT/US2005/001022, dated Apr. 26, 2006.
International Preliminary Report on Patentability and Written Opinion in PCT Appln. No. PCT/US2005/029615, mailed Mar. 9, 2006.
International Preliminary Report on Patentability and Written Opinion in PCT Appln. No. PCT/US2005/035352, mailed Sep. 11, 2007.
International Preliminary Report on Patentability and Written Opinion in PCT Appln. No. PCT/US2006/025102, mailed Jul. 26, 2007.
International Preliminary Report on Patentability and Written Opinion in PCT Appln. No. PCT/US2006/25104, mailed Jan. 23, 2007.
International Preliminary Report on Patentability and Written Opinion in PCT Appln. No. PCT/US2007/061944, mailed Feb. 14, 2008.
International Preliminary Report on Patentability in PCT Appln. No. PCT/US2006/008049, dated Nov. 6, 2007.
International Preliminary Report on Patentability in PCT Appln. No. PCT/US2006/008050, dated Nov. 6, 2007.
International Preliminary Report on Patentability in PCT Appln. No. PCT/US2006/025103, dated Mar. 24, 2009.
International Search Report and Written Opinion in PCT Appln. No. PCT/US2006/008049, mailed Oct. 19, 2007.
International Search Report and Written Opinion in PCT Appln. No. PCT/US2006/008050, mailed on Oct. 19, 2007.
International Search Report and Written Opinion of the International Search Authority for Intl. Appl. No. PCT/US05/45722 mailed Jan. 19, 2007.
International Search Report and Wrtitten Opinion in PCT Appln. No. PCT/US2006/025103, mailed Jan. 29, 2008.
International Search Report in EP Appln. No. 05802579.2-1527, dated May 2, 2008.
International Search Report in PCT Appln. No. PCT/US2004/033777, mailed Jan. 19, 2006.
International Search Report in PCT Appln. No. PCT/US2005/001022, mailed Apr. 24, 2006.
International Search Report in PCT Appln. No. PCT/US2005/029615, mailed Mar. 9, 2006.
International Search Report in PCT Appln. No. PCT/US2005/035352, mailed Sep. 11, 2007.
International Search Report in PCT Appln. No. PCT/US2006/025102, mailed Jul. 26, 2007.
International Search Report in PCT Appln. No. PCT/US2006/25104, mailed Jan. 23, 2007.
International Search Report in PCT Appln. No. PCT/US2007/061944, mailed Feb. 14, 2008.
Ishitani, Lucila, et al., "Masks: Bringing Anonymity and Personalization Together", IEEE Security & Privacy, vol. 1, Issue 3, May/Jun. 2003, pp. 18-23.
Japanese Patent Office, Official Action issued Dec. 17, 2010, mailed Dec. 27, 2010 in Japanese Patent Application No. 2007-528053 (non-official translation), 7 pgs.
Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.
Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.
Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.
Lee, Ching-Cheng, et al., "Category-Based Web Personalization System", COMPSAC 2001, Oct. 8-12, 2001, pp. 621-625.
Leuski, Anton et al. 2000. Lighthouse: Showing The Way To Relevant Information. IEEE, Oct. 2000, pp. 125-129.
Liu, Jian-Guo, et al., "Web Mining for Electronic Business Application", PDCAT 2003, Aug. 27-29, 2003, pp. 872-876.
Liu, Jian-Guo, et al., "Web Usage Mining for Electronic Business Applications", Machine Learning and Cybernetics, Shanghai, China, Aug. 2004, pp. 1314-1318.
Lu, Hongjun, et al., "Extending a Web Browser with Client-Side Mining", APWeb 2003, LNCS 2642, Springer-Verlag, Berlin, Germany, (c) 2003, pp. 166-177.
Luxenburger, Julia, et al., "Query-Log Based Authority Analysis for Web Information Search", WISE 2004, LNCS 3306, Springer-Verlag, Berlin, Germany, Nov. 1, 2004, pp. 90-101.
Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.
Mitchell, T., "Decision Tree Learning Based on Machine Learning" (Apr. 5, 2003), lecture slides for textbook Machine Learning, McGraw Hill, 1997, pp. 46-74 [29 pgs.].
Mobasher, Bamshad, et al., "Automatic Personalization Based on Web Usage Mining", Communications of the ACM, vol. 43, Issue 8, Aug. 2000, pp. 142-151.
Montgomery, Alan et al., Learning About Customers Without Asking, Carnegie Mellon University, Tepper School of Business, Jan. 2002 [35 pgs.].
Netscape Communications Corp., Netcaster Developer's Guide, Netscape Communicator, Sep. 25, 1997 [112 pgs.].
NielsenllNetRatings (24 sheets), webpage online), 2003 NetRatings, Inc. (retrieved on Oct. 8, 2003), retrieved from the internet: <URL:http://www.nielsen-netratings.com>.
Nilsson, B. A., and Robb, J., "Invasion of the Webcasters," PC World, vol. 15, No. 9 (Sep. 1997) p. 204-216 [9 pgs.].
Office Action mailed Feb 2, 2010 from European Serial No. 06013103.4 filed Jun. 16, 2006.
Office Action mailed Aug. 3, 2009 from U.S. Appl. No. 11/427,226, filed Jun. 28, 2006.
Office Action mailed Feb 4, 2010 from U.S. Appl. No. 11/427,243, filed Jun. 28, 2006.
Office Action mailed Jun. 7, 2010 from U.S. Appl. No. 11/427,226, filed Jun. 28, 2006.

Office Action mailed Dec. 8, 2008 from U.S. Appl. No. 11/427,243, filed Jun. 28, 2006.
Office Action mailed Aug. 10, 2009 from U.S. Appl. No. 11/427,282, filed Jun. 28, 2006.
Office Action mailed Oct. 10, 2007 from U.S. Appl. No. 11/207,590, filed Aug. 19, 2005.
Office Action mailed May 12, 2008 from U.S. Appl. No. 11/427,243, filed Jun. 28, 2006.
Office Action mailed Oct. 12, 2010 from U.S. Appl. No. 11/427,243, filed Jun. 28, 2006.
Office Action mailed Sep. 13, 2006 from U.S. Appl. No. 10/700,820, filed on Nov. 4, 2003.
Office Action mailed Oct. 16, 2008 from U.S. Appl. No. 11/207,590, filed Aug. 19, 2005.
Office Action mailed Sep. 16, 2010 from British Serial No. GB0724938.6, filed Jun. 28, 2008.
Office Action mailed Jun. 22, 2009 from U.S. Appl. No. 11/207,590, filed Aug. 19, 2005.
Office Action mailed Jun. 24, 2008 from U.S. Appl. No. 11/207,592, filed Aug. 19, 2005.
Office Action mailed May 24, 2007 from U.S. Appl. No. 10/700,820, filed on Nov. 4, 2003.
Office Action mailed Apr. 25, 2006 from U.S. Appl. No. 10/700,820, filed Nov. 4, 2003.
Office Action mailed Feb. 25, 2009 from U.S. Appl. No. 11/207,592, filed Aug. 19, 2005.
Office Action mailed Jun. 25, 2009 from U.S. Appl. No. 11/427,243, filed Jun. 28, 2006.
Office Action mailed Dec. 26, 2006 from U.S. Appl. No. 10/700,820, filed Nov. 4, 2003.
Office Action mailed Jul. 26, 2010 from Japanese Serial No. JP2008-519504 filed, Jun. 28, 2006.
Office Action mailed Mar. 26, 2010 from U.S. Appl. No. 11/207,590, filed Aug. 19, 2005.
Office Action mailed Apr. 27, 2010 from U.S. Appl. No. 11/427,282 filed, Jun. 28, 2006.
Office Action mailed Oct. 27, 2010 from U.S. Appl. No. 11/207,590, filed Aug. 19, 2005.
Office Action mailed Sep. 27, 2007 from U.S. Appl. No. 11/207,592, filed Aug. 19, 2005.
Office Action mailed Oct. 19, 2007 from U.S. Appl. No. 11/207,589, filed Aug. 19, 2005.
Otsuka, Shingo, et al. 2004. The Analysis of Users Behavior Using Global Web Access Logs. IPSJ SIG Technical Report, vol. 2004 No. 71 (Jul. 13, 2004), pp. 17-24.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Park, Joon S., et al., "Secure Cookies on the Web", IEEE Internet Computing, vol. 4, Issue 4, Jul./Aug. 2000, pp. 36-44.
Payton, D., et al. 1999. Dynamic collaborator discovery in information intensive environments. ACM Comput. Surv. 31, 2es, Article 8 (Jun. 1999), pp. 1-8.
PCT International Preliminary Report on Patentability, dated Jan. 9, 2008, for International Application No. PCT/US06/023386.
PCT International Search Report and Written Opinion dated Jul. 12, 2007, for International Application No. PCT/US06/023386.
PCT International Search Report dated Jan. 23, 2007, for International Application No. PCT/US06/025104.
PCT International Search Report for PCT/US03/13985 mailed Aug. 8, 2003; total of 2 sheets.
Pierrakos, Dimitrios, et al., "Web Usage Mining as a Tool for Personalization: A Survey", User Modeling and User-Adapted Interaction, vol. 13, No. 4, (c) 2003, pp. 311-372.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", Informs Journal on Computing, vol. 15, No. 2, Spring 2003, pp. 123-148.

Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
Smith, Lindsay I. 2002. A Tutorial on Principal Components Analysis. Feb. 26, 2002.
Soumen Chakrabarti et al., "Focused Crawling: A New Approach to Top-Specific Web Resource Discovery" Computer Networks 31 (1999), pp. 1623-1640.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Supplemental Notice of Allowability from U.S. Appl. No. 11/207,589, filed Aug. 19, 2005.
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
UK Appln. No. 0724938.6 2011-02-16—UK IPO Decision of Rejection.
USPTO, Office Action in U.S. Appln. No. 11/688,160, mailed Feb. 16, 2011.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.
Yuichi Yagawa et. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.
Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.
Ad Close, Webpage [online]. C/net Downloads.com [retrieved on Oct. 4, 2001]. Retrieved from the Internet <URL http//download.cnet.com/downloads/0-10059-100-915154.html>.
Ad Muncher, Webpage [online]. C/net Downloads.com [retrieved on Oct. 4, 2001]. Retrieved from the Internet <URL:http//download.cnet.com/downloads/0-33567-18-100-2750044.html>.
AdDelete, Webpage [online]. C/net Download.com [retrieved on Oct. 4, 2001]. Retrieved from the Internet <URL:http//download.cnet.com/downloads/0-10059-100-7003126.html>.
Adextinguisher-Introduction and News Sections. Webpage [online][retrieved on Oct. 4, 2001]. Retrieved from the Internet URL:http//adext.magenet.net.html.
AdPurger, Webpage [online]. C/net Downloads.com [retrieved on Oct. 4, 2001]. Retrieved from the Internet <URL:http//download.cnet.com/downloads/0-10068-100-5067717.html>.
AdsOff, Webpage [online]. C/net Downloads.com [retrieved on Oct. 3, 2001]. Retrieved from the Internet <URL:http//download.cnet.com/downloads/0-10059-100-9 12651.html>.
AdSubract SE, Webpage [online]. C/net Downloads.com [retrieved on Oct. 4, 2001]. Retrieved from the Internet <URL:http//download.cnet.com/downloads/0-3356727-100-5963713.html>.
Advertising Killer, Webpage [online]. C/net Downloads.com [retrieved on Oct. 3, 2001]. Retrieved from the Internet <URL.http//download.cnet.com/downloads/0-10059-100-1539520.html>.
Advisory Action dated Nov. 19, 2008 issued in U.S. Appl. No. 11/015,583, 3 pages.
AllGone, Webpage [online]. C/net Downloads.com [retrieved on Oct. 4, 2001]. Retrieved from the Internet <URL:http//download.cnet.com/downloads/0-10068-100-2915974.html>.

AnalogX Pow, Webpage [online]. C/net Downloads.com [retrieved on Oct. 3, 2001]. Retrieved from the Internet <URL:http//download.cnet com/downloads-0-3356748-100-915372.html>.

Banner Zapper, Webpage [online]. C/net Downloads.com [retrieved on Oct. 4, 2001]. Retrieved from the Internet <URL:http//download.cnet.com/downloads/0-3356727-100-6384611.html>.

BanPopup, Webpage [online]. C/net Downloads.com [retrieved on Oct. 4, 2001]. Retrieved from the Internet <URL:http//download.cnet.com/downloads/0-10059-100-6901908.html>.

Black List. Webpage [online]. C/net Downloads.com [retrieved on Oct. 4, 2001]. Retrieved from the Internet <URL.http/download cnet.com/downloads/0-10059-100-902347 html>.

Claria—Company Information—Corporate Review, webpage [online], retrieved on Mar. 3, 2005, retrieved from the internet: <URL:http://www.claria.com/companyinfo.html>.

Close Popup 4.0, Webpage [online]. Take A Hike Software [retrieved on Oct. 4, 2001]. Retrieved from the Internet <URL:http//www.ryanware.com/close_popup.html>.

Close Popup, Webpage [online]. C/net Downloads.com [retrieved on Oct. 4, 2001]. Retrieved from the Internet <URL:http//download.cnet.com/downloads/0-10059-100-905799.html>.

CobraSoft PopStop, Webpage (online). C/net Downloads.com [retrieved on Oct. 4, 2001]. Retrieved from the Internet <URL:http//download cnet.com/downloads/0-10058-100-6926765.html>.

Compare Prices and Read Reviews on AdsOff! Epenions.com. Webpage [online]; Jan. 21, 2001. Obtained from corresponding International Application PCT Search Report.

CrushPop 2000, Webpage [online]. www.32bit.com [retrieved on Oct. 4, 2001]. Retrieved from the Internet <URL.http//32bit.com/software/listings/Internet/Special/180P/13794.html>.

Definition of "close button", Microsoft Press Computer Dictionary, 3rd ed. (Redmond WA: Microsoft Press, 1997).

Directive 2002/58/EC of the European Parliament and of the Council of Jul. 12, 2002 concerning the processing of personal data and the protection of privacy in the electronic communications sector (Directive on privacy and electronic communications), Official Journal L 201 , Jul. 31, 2002 P. 0037-0047 (downloaded.

DoubleClick products (17 total pgs); Webpage [online] [retrieved on Jun. 11, 2003]; Retrieved from the Internet: <URL: http://www.doubleclick.com>.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Google search for "define: close button", Mar. 2, 2007.

Heller, Laura, "Target gets mod in Manhattan", DSNRetailing Today, v40 n16, Aug. 20, 2001: 2, 37.

InterMute, Webpage [online]. C/net Downloads.com [retrieved on Oct. 3, 2001]. Retrieved from the Internet <URL:http//download.cnet.com/downloads/0-10059-100-906599. html>.

International Search Report in PCT Appln. No. PCT/US04/09918, mailed Mar. 10, 2005 [3 pages].

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

Kourbatov, Opening a Window, Jul. 8, 2000, plublished by www.javascripter.net, whole document.

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May, 1999 (in Conf. Proc. 8th Int'l WWW Conf., Toronto, Canada, May 11-14, 1999).

Marcebra Net, Webpage [online]. C/net Downloads.com [retrieved on Oct. 4, 2001]. Retrieved from the Internet <URL:http//download.cnet.com/downloads/0-3364666-100-5210875.html>.

Mr. KillAd. Webpage [online]. C/net Downloads.com [retrieved on Oct. 4, 2001]. Retrieved from the Internet <URL:http//download.cnet.com/downloads/0-10059-100-895339 html>.

Nagger, Webpage [online]. C/net Downloads.com [retrieved on Oct. 4, 2001]. Retrieved from the Internet <URL:http//download.cnet.com/downloads/0-3356748-100-2497932 html>.

NoAds 2000.6.30.1, Webpage [online] south bay software [retrieved on Oct. 4, 2001]. Retrieved from the Internet <URL:http//www.southbaypc.com/NoAds.html>.

Non-Final Rejection dated Dec. 20, 2006 issued in U.S. Appl. No. 11/015,583, 8 pages.

Non-Final Rejection dated Jul. 20, 2009 issued in U.S. Appl. No. 11/015,583, 7 pages.

NoPops 1.1, Webpage [online]. WebAttack.com [retrieved on Oct. 4, 2001]. Retrieved from the Internet <URL:http//www.webattack.com/get/nopops.shtml>.

Paraben's AdStopper, Webpage [online]. C/net Downloads.com [retrieved on Oct. 4, 2001]. Retrieved from the Internet <URL:http//download.cnet.com/downloads/0-10059-100-2643648.html>.

PCT International Search Report for application No. PCT/US02/35981, 3 sheets; mailed Apr. 4, 2003.

PCT International Search Report re: International Application No. PCT/US05/29615 dated Feb. 20, 2006.

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

Popki Popup Closer 1.4, Webpage [online]. WebAttack.com [retrieved on Oct. 4, 2001]. Retrieved from the Internet <URL:http//www.webattack.com/get/popki.shtml>.

PopKill, Webpage [online]. C/net Downloads.com [retrieved on Oct. 4, 2001]. Retrieved from the Internet <URL:http//download.cnet.com/downloads/0-10059-100-6967054.html>.

PopNot, Webpage [online]. C/net Downloads.com [retrieved on Oct. 4, 2001]. Retrieved from the Internet <URL http//download.cnet.com/downloads/0-100-59-100-5112702.html>.

PopUp Eraser, Webpage [online]. C/net Downloads.com [retrieved on Oct. 4, 2001]. Retrieved from the Internet <URL:http//download.cnet.com/downloads/0-10059-100-6322841.html>.

Popup Hunter, Webpage [online]. C/net Downloads.com [retrieved on Oct. 4, 2001]. Retrieved from the Internet <URL:http//download.cnet.com/downloads/0-10059-100-1451171.html>.

PopUp Killer, Webpage [online]. C/net Downloads.com [retrieved on Oct. 3, 2001]. Retrieved from the Internet <URL.http//download.cnet.com/downloads/0-10059-100-7253644 html>.

Popup Smasher, Webpage [online]. C/net Downloads.com [retrieved on Oct. 4, 2001]. Retrieved from the Internet <URL:http/download.cnet.com/downloads/0-3364664-100-7209048.html>.

Pop-up stopper, Webpage [online]. C/net Downloads.com [retrieved on Oct. 3, 2001]. Retrieved from the Internet <URL:http//download.cnet.com/downloads/0-10059-100-6803957.sub.—html&-gt;.

PopupDummy, Webpage [online]. C/net Downloads.com [retrieved on Oct. 4, 2001]. Retrieved from the Internet <URL:http//download.cnet.com/downloads/0-10059-100-6943327.html>.

Privacy and Electronic Communications (EC Directive) Regulations 2003 (PECR), No. 2426, Electronic Communication, Sep. 2003.

Ready, Kevin et al., "Plug-n-Play Java Script" (Indianapolis, IN: New Riders Publishing, 1996): 19-22, 39, 40 and 43-45.

Restriction Requirement dated Oct. 31, 2007 issued in U.S. Appl. No. 11/015,583, 6 pages.

Surf In Peace 2.01, Webpage [online]. WebAttack.com [retrieved on Oct. 4, 2001]. Retrieved from the Internet <URL:http//www.webattack.com/get/sip.shtml>.

U.S. Appl. No. 09/993,887, filed on Nov. 27, 2001, by Jax B. Cowden, et al.

U.S. Appl. No. 09/993,904, filed on Nov. 27, 2001, by Jax B. Cowden, et al.

U.S. Appl. No. 09/993,906, filed on Nov. 27, 2001, by Jax B. Cowden, et al.

U.S. Appl. No. 11/207,590—Jul. 5, 2011 PTO Office Action.

U.S. Appl. No. 11/377,095—Jul. 12, 2011 PTO Office Action.

Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.

US. Appl. No. 09/993,888, filed on Nov. 27, 2001, by Mark E. Pennell, et al.

Web Magician, Webpage [online]. RocketDownLoad.com [retrieved on Oct. 4, 2001]. Retrieved from the Internet <URL:http/www.rocketdownload.com/Details/Intelwebmag.html>.

www.conversionruler.com/faq.php, Feb. 4, 2003.

Zero Popup, Webpage [online]. C/net Downloads.com [retrieved on Oct. 4, 2001]. Retrieved from the Internet <URL:http//download.cnet.com/downloads/0-3356748-100-7163307.html>.

* cited by examiner

METHOD FOR PROVIDING CONTENT TO AN INTERNET USER BASED ON THE USER'S DEMONSTRATED CONTENT PREFERENCES

RELATED APPLICATION

This application claims the benefit of U.S. Provisional Patent Application No. 60/662,680, entitled "Method and Device for Publishing Behavioral Observations to Customers" filed on 17 Mar. 2005 by Scott Eagle, Marc Silverberg, Scott VanDeVelde, Craig Zeldin, David Goulden, Eric McKinlay and Dominic Bennett. That application is incorporated by reference for all purposes.

BACKGROUND OF THE INVENTION

The present invention relates generally to the field of market research, and in particular, it relates to the use of user behavior to define content offered to that user.

The technique of gathering information about consumer behavior on the internet was set out in commonly-owned U.S. patent application Ser. No. 11/226,066, entitled "Method and Device for Publishing Cross-Network User Behavioral Data" filed on 14 Sep. 2005. (the "'066" application), published as U.S. Patent Publication No. 2006-0136528 A1 on Jun. 22, 2006, issued Apr. 6, 2010 as U.S. Pat. No. 7,693,863. That application is incorporated by reference herein for all purposes.

The technique of the '066 Application teaches how information about user behavior on the internet can be gathered. In sum, that application teaches that a behavior module can reside on a user computer, which module can observe and record user behavior in terms of keystrokes, mouse clicks and so on. Also, the behavior module can also observe information about websites visited by the user. In conjunction with software incorporated into the behavior module, data about the web site or web page can be analyzed and the site categorized into one of a set of categories defined by the behavior module. Information identifying the category, as well as information about the user's navigation behavior, such as the when the site was visited, how much time was spent there, and what the user did, can also be gathered by the behavior module. Finally, the behavior module can summarize the information and compact it into a form suitable for transmission, such the form generally known as a "cookie."

What is not taught by the '066 application, and not seen in the art, is an understanding of how to employ such information to provide content to a user based on what that user wants to see. It remains to the present invention to provide such functionality to the art.

SUMMARY OF THE INVENTION

An aspect of the present invention is a method of providing content from an internet server to an interne user based on the user's interne navigation history. The method begins with the step of installing a profile decoder, including a profile library, on the server. The profile decoder maps server content to content categories contained in the profile library. The server then receives a communication from a user then in internet communication with the server, at least a portion of that communication including an encrypted summary of user navigation history. The server then processes the user communication in the profile decoder to identify user content preferences by matching user content preferences with available server content, employing the profile server. Finally, the server provides content to the user based on the user's identified preferences.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
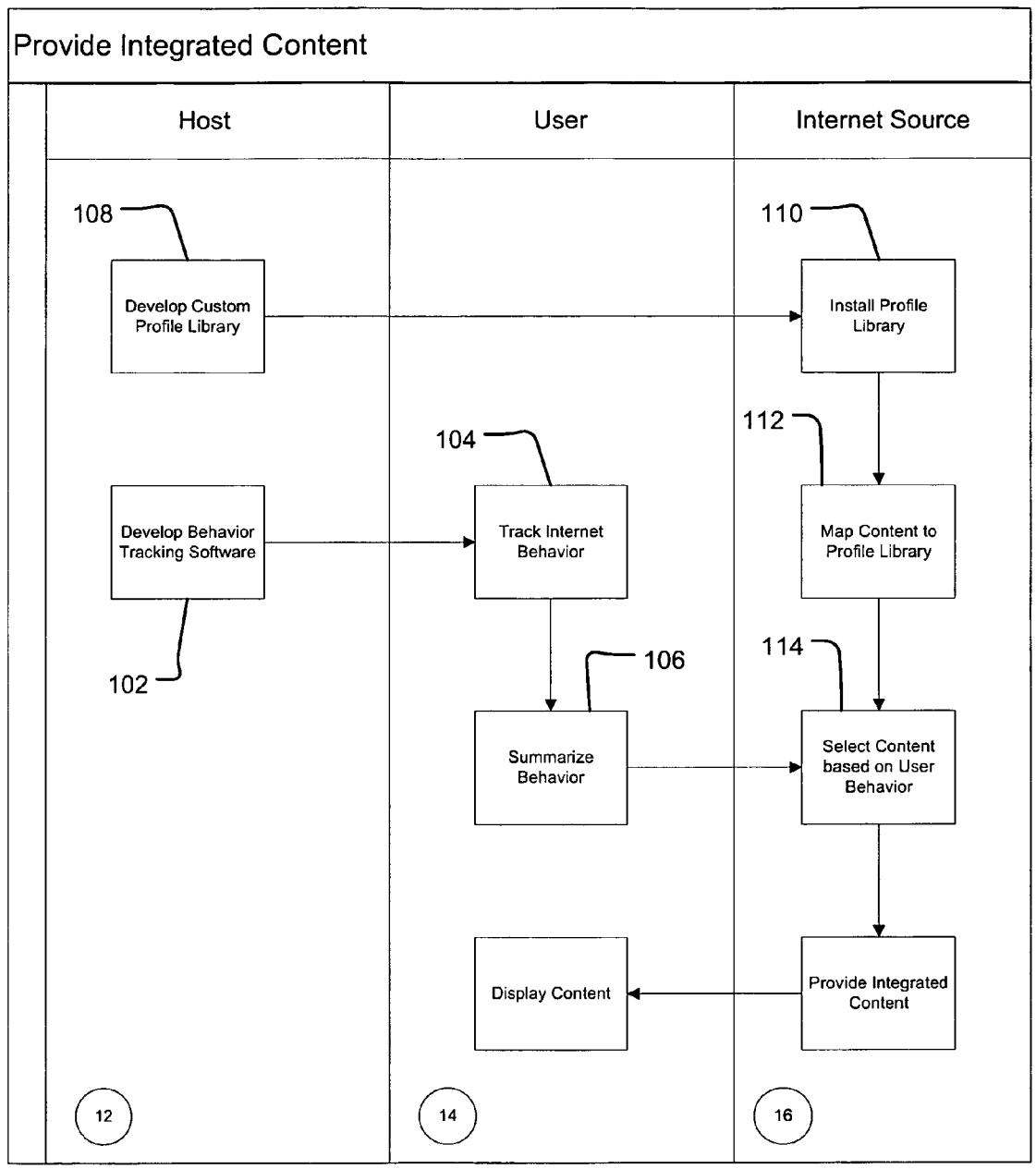
FIG. 1 illustrates a process according to an embodiment of the present invention.

An embodiment of the process by which the present invention can provide integrated content to a user is illustrated in FIG. 1. As seen there, the process involves the interaction between three entities, a host company 12, a user 14 and an internet source 16. The first entity develops and provides the software employed in the remainder of the process and cooperates in the process operation. The user can be any entity making use of the internet, most often an individual. The last entity is a source of content on the internet. Such sources fall into several groups, based on the orientation of the internet site being operated. One type is an internet website oriented to a single company or product, such as CNN or Ford. Another type is a website that serves as a retail operation, such as PC Connection or Amazon. A third type operates a portal, which serves as a gateway to other content, examples of which are Yahoo! or Lycos. A final distinct type of site is the search-oriented site, such as Google or Alta Vista. Other sites are hybrids of these types, or are in the act of morphing from one type to another.

All of these website types, however, generally seek to attract and hold users' attention, whether to sell products or to promote user presence on the site and exposure to advertising on the site. It has been found by the assignee of the present invention that improved information about user preferences can be derived directly from user behavior, as set out in the '066 Application. The disclosure of that application sets out the use of a behavior tracking module, resident on a user computer, which records user actions as well as information concerning the website being visited.

Such behavior tracking modules are developed by the host company and then installed on user computers, as shown in step 102. on the user computer, the module tracks user actions on the internet, as seen in step 104, and then summarizes that behavior in step 106.

Figure 2:
FIG. 2 depicts the operation of a user computer to produce a behavior profile according to an embodiment of the present invention.

As shown in FIG. 2, a behavior tracking module can collect and summarize data on the range of user behavior on the internet. In the example shown, the user has engaged in interactive activities, such as posting photographs online, as well as reading about a number of subject areas, such as movie reviews, pregnancy and home/food/health issues. In addition, the module can draw inferences from certain behaviors. If one visits a number of sites featuring a single product, for example, the module infers that the user is shopping for that item.

The module summarizes the behavior data into a profile 22, encrypts the profile to ensure security, and prepares it for transmission. Such a transmission can take a number of forms. The '066 Application focused on the well-known medium of cookies, which are widely employed for this purpose, but a number of other formats are available. A drawback of cookies is that space is limited, and standard formats permit only a limited amount of data. That drawback can be overcome by substituting direct internet communication, utilizing email facilities such as SNMP.

In parallel with deployment of behavior tracking modules to user computers, the host company develops and deploys custom profile library software for internet source providers, as seen in FIG. 1, step 108. That software is deployed directly to an internet source provider's server, in step 110. This software bridges the systems used by the host for categorizing subject matter (as explained in the '066 Application) and the system employed by the internet source provider for organizing its own content or products. Step 112 calls for the custom profile library to map content from the provider system to the library.

Figure 3:
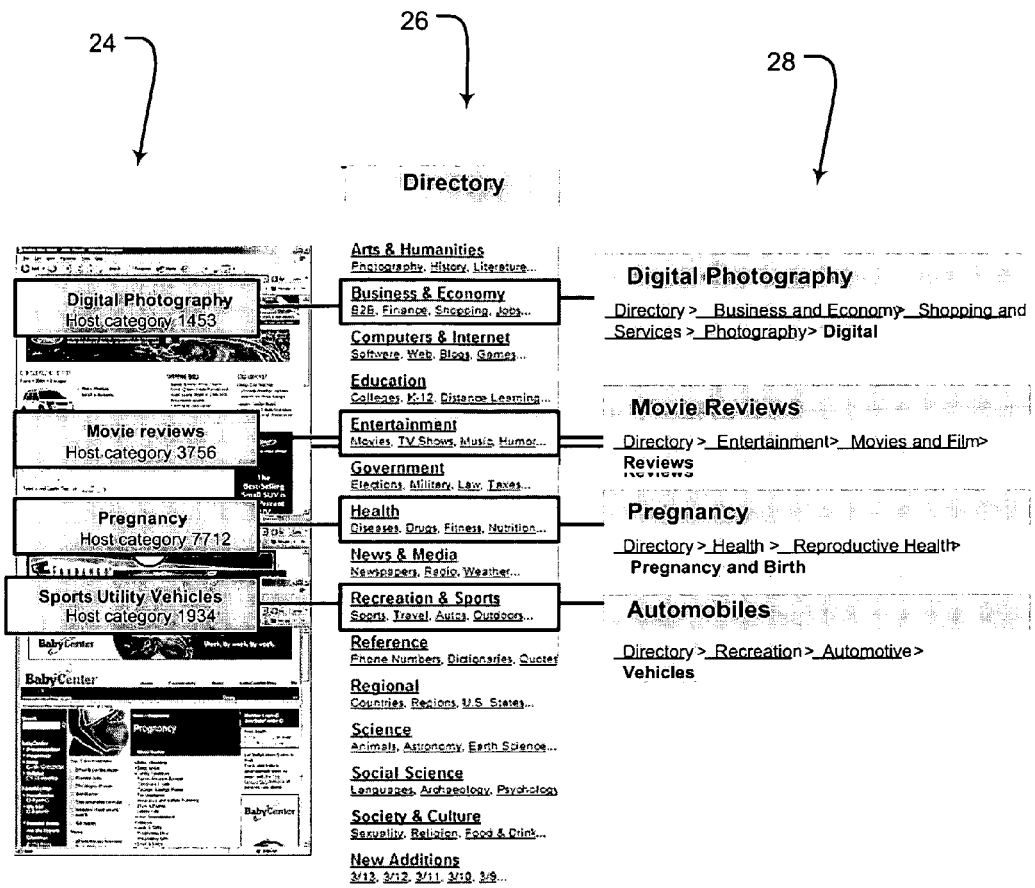
FIG. 3 illustrates a process for mapping host category information to an internet content provider's information schema.

The mapping process is shown more clearly in FIG. 3. There, category information from the host company is shown in column 24. As can be seen, for example, digital photography is classified by the host company as category 1453, movie reviews as category 3756, as so on. Column 28 shows the way that the provider organizes content. That organization can take a number of forms, but here it is a hierarchical, index format, with digital photography, for example, being indexed under the Business and Economy general subject, and then into Shopping and Services, followed by Photography, and then Digital. The custom profile library maps these two organizations to each other, as shown in column 26. The technical implementation of such a mapping operation can be entirely conventional, with the result that step 112, FIG. 1, produces a library that is prepared to accept category information based on the schema adopted by the host company, and instantly associate that information with content stored on the provider server.

Figure 4:
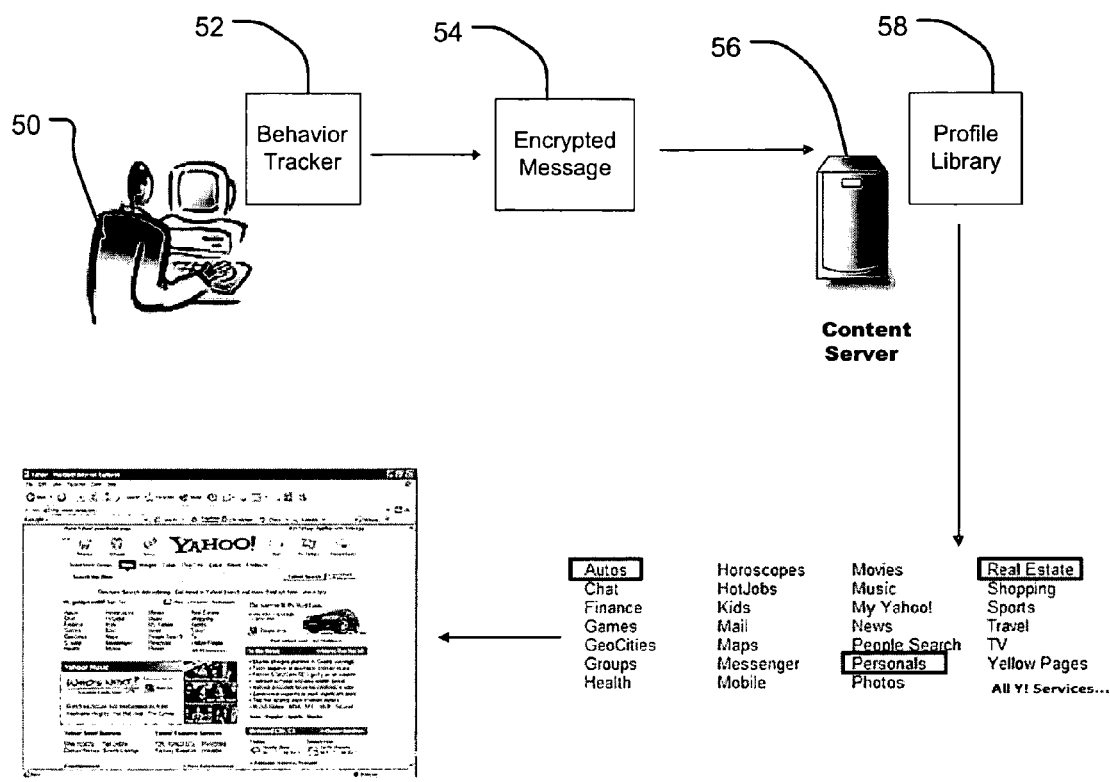
FIG. 4 illustrates the information flow in an embodiment of the present invention.

FIG. 4 depicts the operations that occur when a user 50 having a resident behavior tracking module 52 logs onto an internet provider server 56 having a host profile library 58 running on the same. As part of the logon handshake routine, the user computer sends an encrypted message 54 to the server. This message can take the form of a cookie or another form of message, as discussed above.

The server profile library processes the user message (FIG. 1, step 114) and it identifies content of interest to the user, based on the user's recent behavior. Just as the method of the '066 Application presents a long step from conventional market research, in terms of the precision of the data offered, the present invention takes that another distance by trimming the time factor almost to real time. Indeed, this method offers the possibility that the user could come directly from a series of sites on which she was shopping for, say an SUV. The profile library can identify that pattern and is prepared to offer the user content geared to exactly that behavior.

Figure 5:
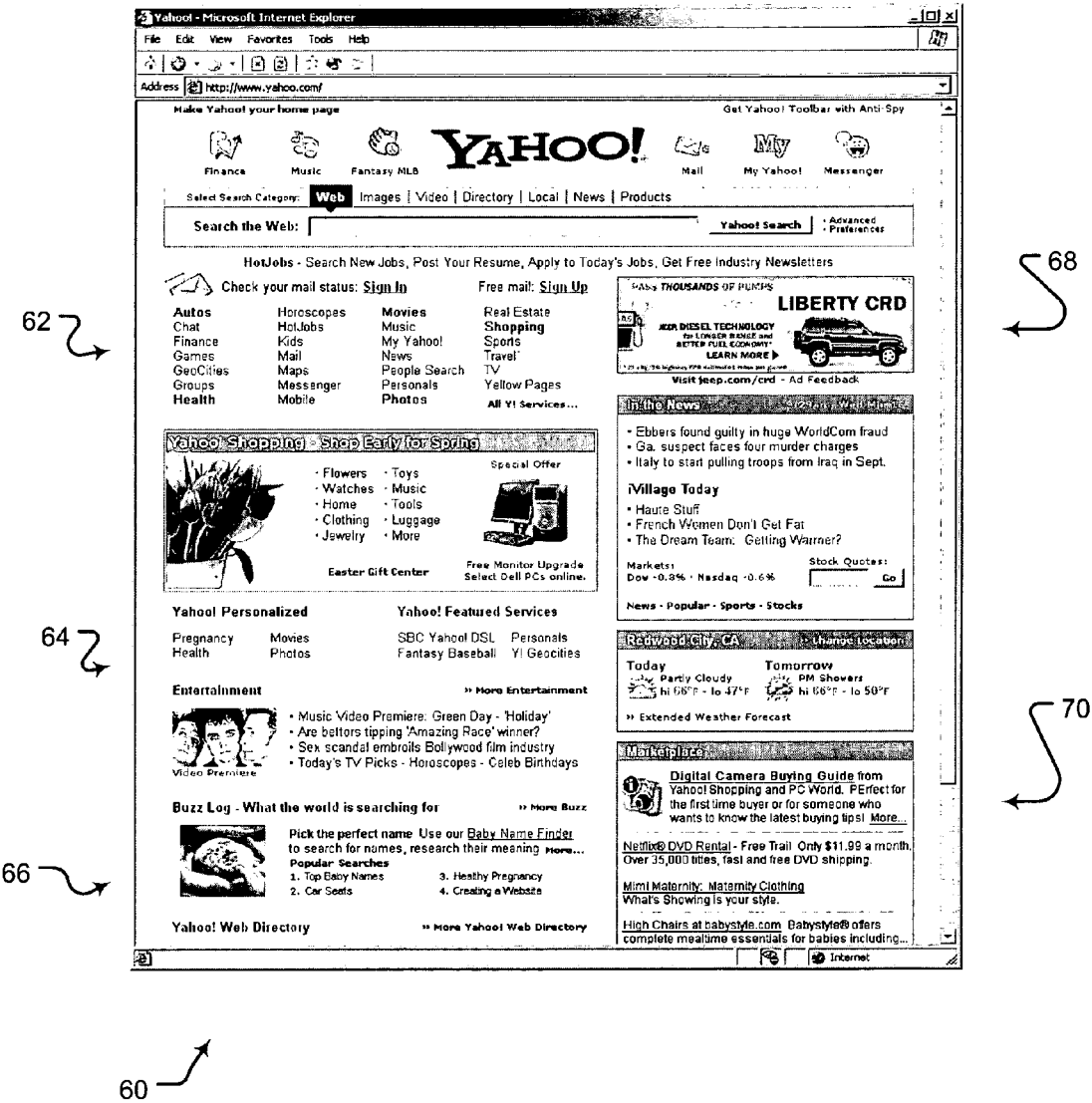
FIG. 5 illustrates user screen generated by an internet content provider, based on information communicated from the behavior tracking module resident on the user computer.

FIG. 5 illustrates how a portal website could take advantage of the information provided by the system of the present invention. Based on the knowledge gained from the message transmission, the provider can offer a user screen 60 on which the menu block 62 is oriented toward automobile, movie and health information. The personalized block 64 is aimed specifically at such content, and the "buzz log" portion is aimed at pregnancy-related subjects. An SUV advertisement 68 is positioned on the right side of the screen, as is a "marketplace" section featuring digital cameras.

It is important to note that the high degree of personalization achieved by the screen 60 is not the result of user settings, a process that is invariably cumbersome and thus seldom actually kept up to date. Rather, this customization is a direct result of user behavior. Indeed, it is highly probably that at least some of the customization stems directly from user actions taken at the site immediately preceding logon to the present site. A content provider cannot ask for information more timely or accurate than that.

In addition to the information provided in the materials submitted and incorporated by reference, one should understand that cookies are reproduced in a manner accessible to a customer directly. In the prior disclosure, a method was taught of publishing information using cookies. The attached material depicts the cookies being accessible by particular customers. Cookies could simultaneously be created that are available for the network sponsoring the behaviour watching module and for the customer. The file names of the cookies need to be different, in order for the ITEF standard handling of the cookies to serve them when the customer's URL is accessed, in addition to when the sponsor's URL is accessed. Alternatively, cookies could be generated for customers on demand, when the behaviour watching module or another module cooperating with the behaviour watching module senses that a customer URL is being invoked. This can be done quickly enough that the cookies will be accessible during the back and forth of HTML resolutions.

Incorporated by reference to illustrate the technology applied in this application are several previously filed applications. These include:

Anthony G. Martin, Generation of Keywords for Searching in a Computer Network, filed on Dec. 8, 2004, Ser. No. 11/006,933.

Scott G. Eagle, David L. Goulden, Anthony G. Martin, Eugene A. Veteska, Method And Apparatus For Displaying Messages In Computer Systems, filed on May 21, 2002, Ser. No. 10/152,204, issued as U.S. Pat. No. 7,069,515 on Jun. 27, 2006.

Jeff McFadden and David Goulden, Methods And Apparatus For Posting Messages On Documents Delivered Over A Computer Network, filed on Oct. 17, 2003, Ser. No. 60/512,605.

Dominic Bennett, Matt Westover, and Dan Hu, Techniques For Analyzing The Performance Of Websites, filed on Nov. 4, 2003, Ser. No. 10/700,820.

Jeff McFadden and David Goulden, Methods And Apparatus For Posting 40 Messages On Documents Delivered Over A Computer Network, filed on Oct. 17, 2003, Ser. No. 60/512,605.

Jeffrey McFadden, David Goulden, and Eugene A. Veteska, Methods And Apparatus For Posting Messages On Documents Delivered Over A Computer Network, filed on Sep. 28, 2004, Ser. No. 10/951,669.

Jeffrey McFadden, Scott G. Eagle, David L. Goulden, and Anthony G. Martin, Optimization of Advertising Campaigns on Computer Networks, filed on Oct. 17, 2003, Ser. No. 60/512,607.

Jeffrey McFadden, Scott G. Eagle, David L. Goulden, and Anthony G. Martin, Optimization of Advertising Campaigns on Computer Networks, filed on Mar. 2, 2004, Ser. No. 10/790,892.

Anthony G. Martin, System and Methods for Using Continuous Messaging Units in a Network Architecture, filed on Jun. 17, 2002, Ser. No. 10/174,403, issued as U.S. Pat. No. 7,219,139 on May 15, 2007.

Anthony G. Martin, System, Method and Computer Program Product for Presenting Information to the User Utilizing Historical Information about the User, filed on Jan. 25, 2002, Ser. No. 10/057,413, issued as U.S. Pat. No. 7,181,488 on Feb. 20, 2007.

Anthony G. Martin, Presentation of Information to End-users, filed on Jan. 25, 2002, Ser. No. 10/061,107.

Robert W. Wohlers et al., Method And Device Publishing Cross-Network User Behavioral Data, filed Dec. 20, 2004, Ser. No. 60/637,684.

Embodiments

1. A method of publishing behavioral data from a client computer via a network to an authorized domain using a cookie, including: observing cross-network user behavior data using a behavior watching module operating on a user's computer, wherein the cross-network user behavior includes accessing web sites that are not all associated with a particular user behavior data collection network, and further includes at least one of a mouse click-through, enter keystroke or other selection action and at least one keyword derived from context of the selection action; summarizing by subject category for a multiplicity of subject categories the observed cross-network user behavior data using a behavior, summarizing module, including deriving a categorical metric of the user's degree of interest in the subject category from the observed cross-network user behavior data; and publishing the summarized cross-network behavior data from the behavior summarizing module to a memory structure, wherein the memory structure is accessible via a network to a server at an authorized domain when the user uses the network to access the authorized domain; and wherein the authorized domain is a customer domain registered with a sponsor of the behavior watching module.

2. The method of embodiment 1, wherein the publishing is periodic.

3. The method of embodiment 1, wherein the publishing is on demand, when access to the customer domain is detected.

4. A method of publishing behavioral data from a client computer via a network to an authorized domain, including: summarizing observed cross-network user behavior data using a behavior summarizing module operating on a user's computer, wherein the observed cross-network user behavior includes accessing web sites that are not all associated with a particular user behavior data collection network, and further includes at least one of a mouse click-through, enter keystroke or other selection action by the user and at least one keyword derived from context of the selection action; wherein the summarizing includes deriving a categorical metric of the user's degree of interest in subject categories, from the observed cross-network user behavior data, for a multiplicity of subject categories; and publishing the summarized cross-network user behavior data from the behavior summarizing module to a memory structure, wherein the memory structure becomes accessible via a network to a server at an authorized domain when the user uses the network to access the authorized domain; and wherein the authorized domain is a customer domain registered with a sponsor of the behavior watching module.

5. The method of embodiment 4, further including prioritizing a multiplicity of subject categories, selecting a plurality of the multiplicity of subject categories, and publishing the summarized cross-network behavior data for the plurality of subject categories to a single memory structure.

6. The method of embodiment 4, further including observing the cross-network user behavior data using a behavior watching module operating on the user's computer.

7. The method of embodiment 4, wherein the cross-network behavioral data includes visits to a plurality of web sites or selections of banner ads that are not all associated with a particular behavioral data collection network. [portal, virtual storefront, content provider].

8. The method of embodiment 5, wherein the cross-network behavioral data includes behavioral data corresponding to a plurality of visits to web sites or selections of banner ads that are not all associated with a particular behavioral data collection network.

9. The method of embodiment 4, wherein the cross-network behavioral data includes behavioral data corresponding to a plurality of visits to web sites or selections of banner ads that are accessed using a plurality of browsers.

10. The method of embodiment 4, wherein publishing takes place on a periodic basis.

11. The method of embodiment 4, wherein publishing takes place on an update basis, after one or more web sites have been visited or one or more banner ads have been selected.

12. The method of embodiment 4, further including receiving at the user's computer advertising targeted using the summarized cross-network user behavior data published to the memory structure that became accessible when the user used the network to access the authorized domain.

13. A method of publishing behavioral data collected by a behavior watching module operating on a user's computer, including: summarizing cross-network user behavior data recorded to [persistent] memory, the summarizing including, for a multiplicity of subject categories, deriving any one or more of (1) categorizing recency of visiting a web site in the subject category by evaluating a most recent visit time-date indicator, (2) categorizing frequency of user visits to web sites in the subject category by rolling up indicators of visits during ten or more discrete time segments [non-overlapping; daily], which discrete time segments were recorded on a rolling basis [bit string; rolled daily], (3) categorizing recency of selections of a banner ad to obtain additional information in the subject category by evaluating a most recent visit time-date indicator, (4) categorizing frequency of user selections of a banner ad to obtain additional information in the subject category by rolling up indicators of visits during ten or more discrete time segments, which discrete time segments are tracked on a rolling basis; publishing the summarized cross-network behavior data from a behavior summarizing module to a memory structure that becomes accessible via a network to a server at an authorized domain when the user uses the network to access the authorized domain; and wherein the authorized domain is a customer domain registered with a sponsor of the behavior watching module.

14. The method of embodiment 13, further including prioritizing a multiplicity of subject categories, selecting a plurality of the multiplicity of subject categories, and publishing the summarized cross-network behavior data for the plurality of subject categories to a single memory structure.

15. The method of embodiment 13, further including observing the cross-network user behavior data using a behavior watching module operating on a user's computer.

16. The method of embodiment 13, wherein the cross-network behavioral data includes visits to a plurality of web sites or selections of banner ads that are not all associated with a particular behavioral data collection network. [portal, virtual storefront, content provider].

17. The method of embodiment 14, wherein the cross-network behavioral data includes behavioral data corresponding to a plurality of visits to web sites or selections of banner ads that are not all associated with a particular behavioral data collection network.

18. The method of embodiment 13, wherein the cross-network behavioral data includes behavioral data corresponding to a plurality of visits to web sites or selections of banner ads that are accessed using a plurality of browsers.

19. The method of embodiment 13, wherein publishing takes place on a periodic basis.

20. The method of embodiment 13, wherein publishing takes place on an update basis, after one or more web sites have been visited or one or more banner ads have been selected.

21. The method of embodiment 13, further including receiving at the user's computer advertising targeted using the summarized cross-network user behavior data published to the memory structure that became accessible when the user used the network to access the authorized domain.

22. A device operating as part of a user's computer, the device including: a cookies storage area of memory; a persistent memory distinct from the cookies storage area; logic operating as part of the user's computer, without requiring the user to specifically invoke the logic, the logic having access to the cookies storage area and to the distinct persistent memory; a communications channel connected to a network; the logic adapted to receive through the communications channel identifications of favored cookies that should be backed up, automatically back up the favored cookies from the cookies storage area to the distinct persistent memory; automatically detect that at least one particular favored cookie has been deleted or damaged; and automatically restore at least part of the particular favored cookie to the cookies storage area using the data from the distinct persistent memory.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method comprising the steps of:
    (A) storing content on a server system, the content being accessible on said server system according to a first system of organization;
    (B) obtaining a profile library on the server system, the profile library using a second system of organization of content categories, distinct from said first system of organization of content categories, said profile library providing a mapping from the second system of organization of content categories to the first system of organization of content categories;
    (C) using the profile library to generate a map between the second system of organization and the first system of organization;
    (D) receiving, at the server system, a communication from a user computer in communication with the server system, at least a portion of the communication representing a summary of user navigation history on the user computer, the summary having been generated by a behavior tracking module on the user computer, and the summary including information organized according to the second system of organization of content categories;
    (E) in response to said receiving in (D), the server system:
        (e1) mapping at least some of the information from the second system of organization of content categories to the first system of organization of content categories, said mapping using the map from said second system of organization of content categories to said first system of organization of content categories, said mapping producing mapped information;
        (e2) selecting particular available content by the server system based at least in part on the mapped information, said particular content being selected from available content on the server system organized according to the first system of content categories; and
        (e3) sending the particular available content to the user computer.

2. The method of claim 1, wherein the profile library contains a list of categories describing selected types of content.

3. The method of claim 1 wherein receiving a communication includes receiving a cookie containing encrypted text.

4. The method of claim 1, wherein the selecting step includes matching category information contained in the user communication with mapped category and content associations generated in the profile library.

5. A method comprising:
    (A) storing content on a server system, the content being accessible on said server system according to a first system of organization of content categories;
    (B) obtaining at the server system a profile library containing a list of categories, the list of categories being based on a second system of organization of content categories, said second system of organization being distinct from said first system of organization;
    (C) installing the profile library on the server system;
    (D) using the profile library on the server system to generate a map between the second system of organization of content categories and the first system of organization of content categories;
    (E) receiving, by the server system, a communication from a user computer, the communication comprising a cookie containing an encrypted summary of user navigation history generated by a behavior tracking module on the user computer, the summary including information based on the second system of organization of content categories;
    (F) in response to said receiving in (E),
        (f1) the server system using the profile library to map the information from the second system of organization of content categories to mapped information according to the first system of organization of content categories;
        (f2) selecting particular available content by the server system based on the mapped information; and
        (f3) sending the particular available content to the user.

6. The method of claim 1 wherein the step (B) of obtaining comprises:
    (b1) obtaining a profile library on the server system; and
    (b2) using the profile library to generate the map between a second system of organization of content categories to said first system of organization of content categories.

7. The method of claim 1 wherein the communication comprising the summary of user navigation history is received in encrypted form.

8. The method of claim 1 wherein the communication comprising the summary of user navigation history is a cookie containing the summary.

9. The method of claim 1 wherein the server system is part of an internet source.

10. The method of claim 9 wherein the internet source is selected from one or more of the sources comprising:
an internet web site of a company or product;
an internet web site for a retail operation;
an internet web site operating as a portal to other content;
a search-oriented internet site.

11. The method of claim 1 wherein the summary of user navigation history in the communication received in (D) comprises a first multiple subject categories according to said second system of organization of content categories.

12. The method of claim 11, wherein the mapped information comprise a second multiple subject categories according to said first system of organization of content categories, said second multiple subject categories corresponding to said first multiple subject categories.

13. The method of claim 5 wherein the server system is part of an internet source.

14. The method of claim 13 wherein the internet source is selected from one or more of the sources comprising:
an internet web site of a company or product;
an internet web site for a retail operation;
an internet web site operating as a portal to other content;
a search-oriented internet site.

15. The method of claim 5 wherein the summary of user navigation history in the communication received in (E) comprises a first multiple subject categories according to said second system of organization of content categories.

16. The method of claim 15, wherein the mapped information comprise a second multiple subject categories according to said first system of organization of content categories, said second multiple subject categories corresponding to said first multiple subject categories.

17. A method comprising the steps of:
(A) storing content on a server system of an internet source, the content being accessible on said server system according to a source server-specific system of organization;
(B) providing a profile library on the server system, the profile library using a host-specific system of organization of content categories, distinct from said source server-specific system of organization of content categories, said profile library providing a mapping from the host-specific system of organization of content categories to the source server-specific system of organization of content categories;
(C) receiving, at the server system, a communication from a user computer in communication with the server system, at least a portion of the communication representing a summary of user navigation history generated by a behavior tracking module on the user computer, the summary having been generated by a behavior tracking module on the user computer, and the summary including information organized according to the host-specific system of organization of content categories, said information including multiple subject categories of said host-specific system of organization of content categories;
(D) in response to said receiving in (C), the server system:
(d1) mapping at least some of the information from the host-specific system of organization of content categories to the source server-specific system of organization of content categories, said mapping using the profile library to map from said host-specific system of organization of content categories to said source server-specific system of organization of content categories, said mapping producing mapped information comprising multiple subject categories of said source server-specific system of organization of content categories;
(d2) selecting particular available content by the server system based at least in part on the multiple subject categories of said source server-specific system of organization of content categories, said particular content being selected from available content on the server system organized according to the source server-specific system of content categories; and
(d3) sending the particular available content to the user computer.

18. The method of claim 17 wherein the internet source is selected from one or more of the sources comprising:
an internet web site of a company or product;
an internet web site for a retail operation;
an internet web site operating as a portal to other content;
a search-oriented internet site.

* * * * *